United States Patent

Fujikawa et al.

[11] Patent Number: 5,795,509
[45] Date of Patent: Aug. 18, 1998

[54] INJECTION METHOD OF PREPLASTICIZATION INJECTION MOLDING MACHINE

[75] Inventors: Misao Fujikawa; Hirotsugu Otowa, both of Ishikawa, Japan

[73] Assignee: Sodick Co., Ltd., Japan

[21] Appl. No.: 860,542

[22] PCT Filed: Oct. 28, 1996

[86] PCT No.: PCT/JP96/03151

§ 371 Date: Jun. 26, 1997

§ 102(e) Date: Jun. 26, 1997

[87] PCT Pub. No.: WO97/15422

PCT Pub. Date: May 1, 1997

[30] Foreign Application Priority Data

Oct. 27, 1995 [JP] Japan .................... 7-281019

[51] Int. Cl.$^6$ ............. B29C 45/54; B29C 45/76
[52] U.S. Cl. ............ 264/40.1; 264/40.5; 264/328.1; 264/328.19; 425/145; 425/147; 425/558
[58] Field of Search ............ 264/40.1, 40.4, 264/40.5, 40.7, 328.1, 328.19; 425/140, 145, 147, 557, 558

[56] References Cited

U.S. PATENT DOCUMENTS

| | | | |
|---|---|---|---|
| 5,258,147 | 11/1993 | Yokota | 425/145 |
| 5,260,010 | 11/1993 | Yokota | 264/40.4 |
| 5,266,247 | 11/1993 | Yokota | 264/40.4 |
| 5,500,166 | 3/1996 | Sasaki et al. | 264/40.5 |
| 5,665,282 | 9/1997 | Nakamura | 264/40.4 |

FOREIGN PATENT DOCUMENTS

| | | |
|---|---|---|
| 62-20010 | 5/1987 | Japan. |
| 3-97517 | 4/1991 | Japan. |
| 3-97518 | 4/1991 | Japan. |
| 6-170900 | 6/1994 | Japan. |

*Primary Examiner*—Jill L. Heitbrink

[57] ABSTRACT

Molten resin, plasticized in the plasticization chamber, is fed to the injection chamber through a connection passage where it is measured. Before it is injected by the plunger, the connection passage is blocked and the molten resin is preliminarily compressed. This invention provides a method using a preplasticization type injection molding machine that controls the volume of the filled molten resin with little variation utilizing blocking and preliminary compression. By means of blocking or preliminary compression, the position movement by which the plunger moves from the position at which the measurement is completed is calculated, and the position at which the next measurement will be complete is corrected. Furthermore, the molten resin fill operation is done on the basis of the position of the plunger detected at the time of the preliminary compression.

4 Claims, 4 Drawing Sheets

INJECTION METHOD OF PREPLASTICIZATION INJECTION MOLDING MACHINE

TECHNOLOGICAL FIELD

The present invention relates to a method of injection molding using a preplasticization type injection molding machine. More specifically, the present invention relates to an injection method using a preplasticization type injection molding machine that feeds molten resin which has been plasticized in a plasticization chamber to an injection chamber where the molten resin is measured, and injects the molten resin in the injection chamber by means of a plunger.

TECHNOLOGICAL BACKGROUND

Precision molded parts have been manufactured by means of injection molding. In this field, it is essential that the geometry of the mold die cavities be exactly transferred to the molded parts, and that the physical properties of the material be stable. For this purpose, it is important that the molding resin material be stably plasticized (or molten) in terms of its physical properties, that the molten resin be accurately measured in accordance with a predetermined volume, and that the filling volume be accurately controlled, preventing the cushion amount (i.e., the amount of molten resin needed for replenishing the contraction volume of the molded parts upon cooling provided by storing some molten resin in the tip of the injection chamber under high pressure shortly after filling) from varying when maintaining the appropriate pressure.

Performing this type of injection molding with a preplasticization type injection of molding machine, i.e., a machine in which the synthetic resin material is plasticized in the plasticization chamber and is injected from the injection chamber, has the advantage that no leakage of the molten resin takes place except for a minute amount of the resin from between the plunger and the injection cylinder, resulting in little variation in filling volume. The reason is that injection is done by the plunger which is not equipped with a check valve. Therefore, the variation in cushion amount between injection shots can be minimized provided that the molten resin is substantially accurately measured.

Applicant has disclosed, in Toku-Kai-Hei 6-170900 technology for injection molding by a screw preplasticization type of injection molding machine. After the measuring process is completed, the plasticization screw is moved forward to close (hereinafter referred to as "blocking") the connection passage between the plasticization chamber and the injection chamber, followed by injection. Since blocking is done by moving the screw forward, the molten resin in the injection chamber increases slightly in amount. This incremental change in position (hereinafter referred to as "position movement caused by blocking") from the position of the plunger where the completion of measurement is detected (hereinafter referred to as "measurement detection position") to the position of the plunger when the plunger moves backward by means of the blocking operation is calculated so as to correct the next measurement detection position where the measurement is completed. Over the short-term, the resin material is almost continuously plasticized for each molding shot, and therefore, the physical properties of the molten resin does not vary between molding shots. On the other hand, during continuous operations over a longer period of time, the situation may gradually vary. In this case, the position movement caused by blocking will gradually vary. Therefore the measurement detection position corrected by this position movement caused by blocking may be measured with little variation.

However, the molten resin fed to the injection chamber may contain a small amount of resin-dissolved gas, such as bubbles which were not expelled at the time of plasticization. This presence of the bubbles in the molten resin may cause the density of the molten resin to vary, leading to slight variations in the volume of the resin measured. The reason is that, for improved plasticization efficiency, the pressure acting on the molten resin in the injection chamber (which is controlled by the back-pressure acting on the plunger) is lower than the pressure in the plasticization chamber, and therefore bubbles may appear in the injection chamber. Furthermore, when molten resin having a slightly varying density is used to incrementally fill the mold die cavities in accordance with predetermined stroke of the plunger, with no leakage or reverse flow, the actual fill amount may vary slightly. As a result, the cushion amount may also vary slightly.

In applications where the molded items are thin-wall precision molded parts, the following difficulties in terms of molding control are presented. For fill control, conventional technology is adopted in which the plunger speed (filling speed) is predetermined in accordance with the plunger position, and during filling operations, control is performed on the basis of the plunger position giving priority to speed. For this reason, the pressure, during the filling operation, which is generated as a result of the filling speed, may vary depending on the physical properties of the molten resin, especially its viscosity and density. Furthermore, the pressure that is generated at the point of completion of a fill operation when the process switches to a pressure maintaining control (hereinafter referred to as "V-P switch point"), is slightly affected by any variation in the total amount of the molten resin compressed at the V-P switch point; in other words, by the sum of the molded parts, spools, runners, and the cushion. When molding thin-wall precision molded parts, the geometry precision and the physical properties of the molded parts are affected by the pressure at the time when solidification starts to take place. This is because solidification starts immediately after the molten resin fills in the mold die cavities. Therefore, when the measured volume or fill amount varies substantially, the pressures at the time of completion of the filling operation also varies, and the geometric precision and the physical properties of the thin-wall precision molded parts are affected.

SUMMARY OF THE INVENTION

In accordance with the present invention, a method of injecting using a preplasticization type injection molding machine which includes a plasticization chamber where the synthetic resin material is plasticized, an injection chamber where the molten synthetic resin material is measured and injected, a plunger mounted in the injection chamber for reciprocal movement therein, and a connection passage connecting between the plasticization chamber and injection chamber; the method comprises the steps of:

measuring the resin material plasticized in the plasticization chamber which is fed to the injection chamber through the connection passage, the measuring terminating at a measurement detection position;

blocking the connection passage;

preliminarily compressing the molten resin to a predetermined pressure by means of the plunger after the step of blocking;

detecting the position of the plunger after the preliminary compressing step;

filling the mold die cavities with a molten resin based on the position of the plunger after the preliminary compressing step; and correcting the measuring position for the detecting step of the next injection based on the change in position of the plunger from the measurement detection position caused by the preliminary compression.

The preliminary compression of the molten resin makes the final density of the molten resin equal to the original density of the molten resin. Therefore measuring the plunger position at the preliminary compression position at the time when the resin is preliminarily compressed results in the measurement of the actual volume of resin which is not influenced by density. The measurement detection position is corrected or compensated by the position movement caused by the preliminary compression including the previously described effect caused by a difference in density, and therefore, the volume of the molten resin, when blocked and preliminarily compressed, essentially agrees with the set or desired measuring volume without being affected by the volume of dissolved gas.

The accurately measured molten resin is filled on the basis of the preliminary compression position that results in the accurately filled volume of the molten resin, with little or no variation in fill amount. As a result, little or no variation in cushion amount (for maintaining pressure) takes place, and the completion pressure achieves the desired level with little or no variation.

In another embodiment of this invention, a method is provided which includes:

measuring the blocking position to which a plunger has moved during the step of blocking; and correcting the measurement position for the detecting step of the next measurement by the position movement from the measurement detection position to the blocking position caused by the step of blocking in lieu of the correcting the measurement detection position by the position movement resulting from the preliminary compression.

This allows the measurement detection position to be corrected so as to be canceled by the position movement caused by blocking of the preceding molding shot, enabling the volume of the molten resin to be in agreement with the set amount of measurement under the blocking state and allowing the molten resin to be filled on the basis of the preliminary compression position based on the substantially accurately measured volume of the molten resin, with little or no variation in filled volume. As a result, there is little or no variation in cushion amount, and the filling completion pressure is essentially the desired pressure.

In another embodiment of this invention, a method is provided which includes a step of sucking-back (i.e., a momentary decrease of the pressure in the injection chamber to prevent the molten resin from leaking out of the injection nozzle) which is performed just before the mold die opens. During the injection process, the fill control is performed on the basis of the preliminary compression position.

This prevents drooling (i.e., the leakage of resin out of the tip of the injection nozzle) without providing the injection nozzle with a valve for opening and closing the injection hole, and also enables accurate fill control to be performed on the basis of the substantially accurately measured preliminary compression position.

PRESENTLY PREFERRED EMBODIMENTS OF THE INVENTION

Figure 1:
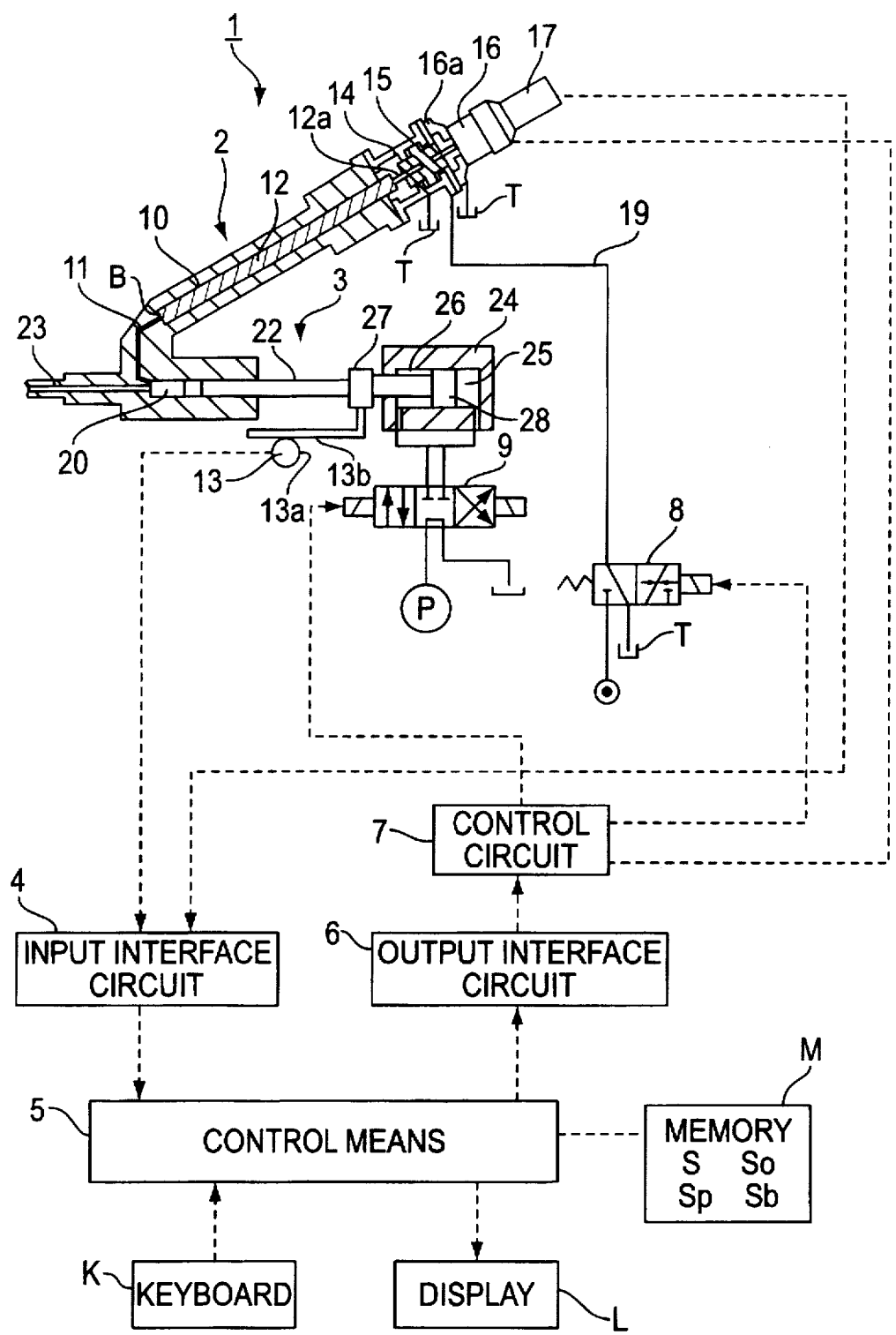
FIG. 1 is a block diagram illustrating a typical plasticization device and injection device of a preplasticization type injection molding machine as used in accordance with a first embodiment of this invention, and its related control equipment.

As shown in FIG. 1, a preplasticization type injection molding machine 1 consist of a plasticization device 2 and an injection device 3. A plasticization chamber 10 formed in the cylinder of the plasticization device 2 and an injection chamber 20 formed in the cylinder of the injection device 3 are connected via a connection passage 11. A rotatable screw 12, which is moveable in the forward and backward directions, is provided inside the plasticization chamber 10. Inside the injection chamber 20 a plunger 22, which is moveable in the forward and backward directions, is provided. The end of the screw 12 forms a shaft 12a formed as a spline shaft. The shaft 12a is inserted into the spline groove on a piston 15 housed in a hydraulic cylinder 14. Furthermore, the circumference of an output shaft 16a of the motor 16 also forms a spline shaft, the output shaft 16a being inserted into the spline groove formed on the opposite side of the piston 15.

Thus, when the motor 16 operates, the piston 15 rotates via said spline groove to cause the screw 12 to rotate, causing the resin material to be plasticized. Here, the rotating speed of the motor 16 is detected through a rotation detection means 17 such as a rotary encoder. The piston 15 is housed in the hydraulic cylinder 14 and pushes the shaft 12a by means of the operating fluid which is supplied from a hydraulic supply source such as an oil pump, via a directional control valve 8 and a piping line 19, to move the screw 12 forward. Thus, the connection passage 11 is closed or blocked. By switching the directional control valve 8 to open the oil chamber for the hydraulic cylinder which leads to the piping line 19 from the tank T, the screw can move backward, venting the connection passage 11 at the time of plasticization by means of the reaction force of the molten resin fed forward at the time of plasticization.

An injection chamber 20 is connected to an injection nozzle 23 at its tip, and the molten resin is injected into the mold die cavity (not indicated in the figure) through the injection nozzle 23. The plunger 22, positioned in the injection cylinder so as to freely reciprocate forward and backward therein, is connected via a coupling 27 to a piston 28 located at its rear inside the hydraulic cylinder 24. The piston 28 moves the plunger 22 forward or backward by supplying hydraulic fluid to the forward movement oil chamber 25 or the backward movement oil chamber 26, respectively. The position of the plunger 22 is detected by a measuring means 13, such as a rotary encoder. As the position of a rack 13b, mounted on the coupling 27 moves, its detection signal is input to the microcomputer control means 5, through an input interface circuit 4.

The microcomputer control means 5 is equipped at least with a keyboard K for inputting injection control conditions such as the measurement reference position S discussed below, a display L for displaying the control state of injection and die clamping, and a memory M for storing the measurement position of the plunger 22. Furthermore, the microcomputer control means 5 controls the motor 16 via an output interface 6 and control circuit 7 in accordance with the plasticization conditions, and controls the blocking and releasing of the screw 12 by switching the directional control valve 8. Furthermore, the microcomputer control means 5 performs back-pressure control during the measurement process, fill control during the injection process, and pressure control by controlling an electromagnetic proportional flow control valve (not indicated in the figure), or a flow control valve such as a servo valve and the directional control valve 9.

The screw preplasticization type injection molding machine described so far is an embodiment of the blocking method. However, the control aspects of this invention also apply to a method in which the screw, whose tip diameter in this embodiment is larger, moves backward to block, or a known method which has a rotary type ball valve. The drive for the plasticization device and the injection device may be of either the electric or hydraulic type. The preliminary plasticization device is not limited to a screw preplasticization type. For instance, it may be a plunger preplasticization type having both a torpedo and a plunger. As the die clamping device may be of a conventional, known design, a detailed description of it is omitted.

Figure 2:
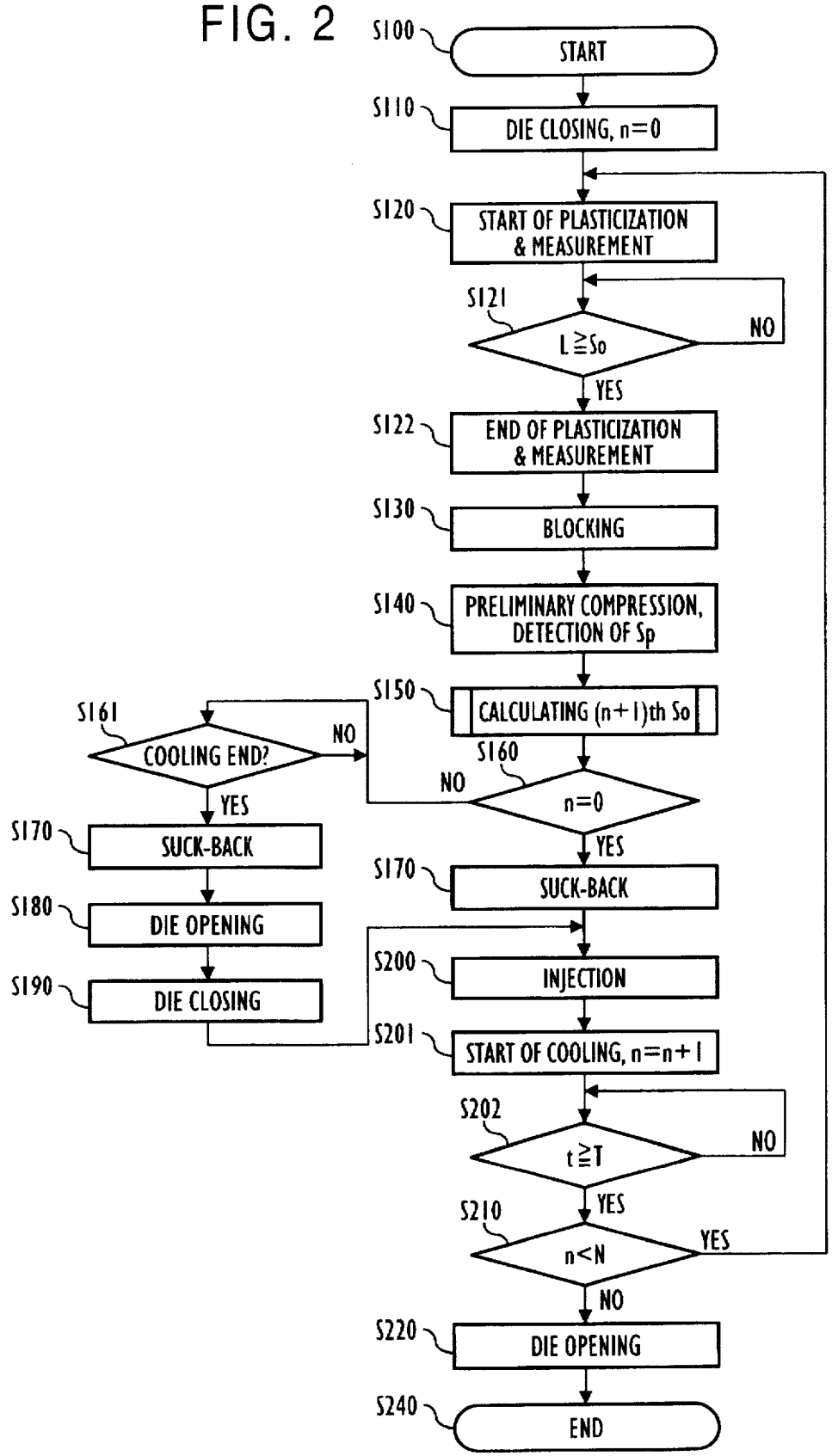
FIG. 2 is a flow chart indicating the control procedure of a first embodiment of the invention.

Using the above-mentioned arrangement, the operational process of the first embodiment will now be described with reference to FIG. 2.

First, the die clamping device (not indicated) is closed, and the die is clamped (S110). Then, a variable n for counting the number of molding cycles is set to 0. The synthetic resin material which is fed to the plasticization chamber 10 from the hopper (not indicated in the figure) is heated by a heating device (not indicated in the figure), and plasticized while being compressed, stirred, and heated by rotation of the screw 12. Next, the molten resin is supplied to the injection chamber 20 through the connection passage 11 to start the measuring operation (S120). Then, the screw 12 moves backward (upward) by means of the reaction force generated when the molten resin is supplied forward, forming a gap B (approximately 1 mm) at the front end of the screw 12, which allows the molten resin material to be supplied to the injection chamber 20 through the connection passage 11. When the molten resin passes through this gap, a flow resistance is generated, causing the pressure of the molten resin in the plasticization chamber 10 to reach a pressure adequate for plasticization. Under this pressure, the resin material is plasticized while air and dissolved gas are expelled. At this time, a slight back-pressure is applied to the molten resin in the injection chamber 20. However, this pressure is lower than the pressure in the plasticization chamber 10 in order to improve the plasticization efficiency. Thus, the back-pressure in the injection chamber 20 is not so high that if the plasticization conditions change gradually during the operation over a long period of time, any dissolved gas in the molten resin may collect as air bubbles, resulting in a variation in the density of the molten resin.

Plasticization and measurement take place continually in such a manner, causing the plunger 22 to move backward. When the plunger position L becomes greater than the measurement detection position So (S121), the screw 12 stops rotating to complete the measurement (S122). Next, the screw 12 is moved forward to block the connection passage 11 (S130). Then, the molten resin in the gap B is pushed into the injection chamber 20, causing the plunger 22 to move backward by that amount.

Next, hydraulic oil is supplied to the forward movement oil chamber 25 to apply thrust to the plunger 22, preliminarily compressing the molten resin to a desired pressure (S140). The pressure applied in the preliminary compression process is on the order of 100 to the 1,000 kg/cm2, which is set according to the resin material used. The position at which the plunger stops after completion of preliminary compression is measured as a preliminary compression position, Sp, which is newly stored. This makes it possible to accurately measure the volume of the molten resin material independent of the volume of dissolved gas. This is because the bubbles of dissolved gas are compressed to a negligibly small volume, resulting in the density of the molten resin being substantially the same as the original density of the resin. In addition, this preliminary compression makes the density of the molten resin in the injection chamber uniform. There are various means for judging how long the preliminary compression should continue. One is to continue the preliminary compression process for a time set by a timer, another is to detect the change in speed of the plunger movement during the preliminary compression and to discontinue compression when the movement becomes zero or minus.

Next, the measurement position is corrected (S150) in order to calculate the measurement detection position So of the next molding shot; this is described below.

Next, it is determined whether the molten resin has been previously injected; this is judged by whether or not the variable n of the number of molding cycles is 0 (S160). For the first shot, n=0, and the process moves to the next "suck-back" step (S170). For the second and subsequent molding shots, i.e., where an injection has been performed previously, a judgment is may be made based on whether the cooling time of the molded parts has elapsed (S161). After the cooling time has elapsed, the process performs a suckback step (S170), the known die opening and molded parts ejection steps are performed (S180), and then the die closing and clamping steps are performed (S190).

With an injection molding machine in which the plunger is used to inject the molten resin, no leak or back flow of the molten resin takes place when the suck-back operation is performed. This is because the connection passage 11 is blocked and the check valve which is used in an inline screw type molding machine is not used in the plunger. Therefore, if the position of the plunger 22 shifts by virtue of the suck-back operation, the significance of the preliminary compression position Sp at which the volume of the molten resin is substantially accurately measured remains unchanged. Fill control (described below), starts on the basis of the position at which the plunger reaches the preliminary compression position, Sp, and the plunger moves forward incrementally from this point by a predetermined amount of stroke. The invention is not limited to use with screw plasticization type machines, and the suck-back operation may be performed in the same manner if the connection passage can be blocked.

Next, the injection process, or the fill control and pressure maintaining control (described below), takes place (S200), and the cooling operation starts (S201). At this point of time, the value 1 is added to the variable n of the number of molding cycles. The next plasticization waits until a pre-set time T has elapsed (S202), and then a judgment is made whether or not molding is to be continued (S210). This judgment is performed by comparing the variable n with the planned number of molding cycles N. Since the molding operation normally continues further, plasticization and measurement re-start (S120). However, if it is the last shot, the die opens after the cooling process completes, ejecting the molded parts to terminate the operation (S220).

Figure 3:
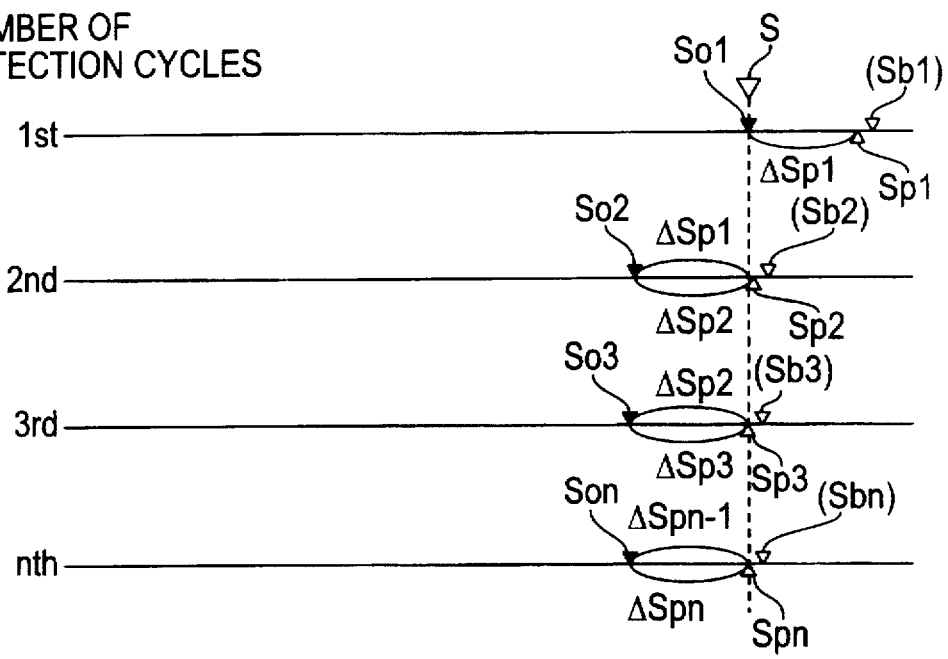
FIG. 3 is a depiction which indicates a method in which the measurement detection position shifts at every measurement by correction of the measurement detection position in accordance with the first embodiment of the invention.

In the first embodiment, the correction of the measurement detection position is performed as follows (S150): The state under which the measurement detection position So is corrected for each molding shot is typically indicated in FIG. 3. For the sake of description, each position data for the first, the second . . . . the nth molding shot, the suffixes 1, 2, . . . . n are given.

First, the first measurement is performed until the plunger reaches the measurement detection position So1=S (S121 and S122). Here, S is the measurement reference position, which is a set measurement volume arrived at by summing the filling volume of the molded parts, the volume of the spool and the runner, and the cushion amount necessary for maintaining the pressure. Next, the blocking operation starts (S130), causing the plunger to move backward to the block position. Sb1. It should be noted, however, that the block position, Sb1, is used only for description purposes, and is not detected in the first embodiment. Then, preliminary compression takes place (S140) to compress the molten resin, which causes the plunger to slightly move forward to the position, Sp1. The preliminary compression position, Sp1, is the position to which the plunger has moved backward Δ Sp1 from the measurement detection position, So1. Subsequently, the filling operation is performed on the basis of the preliminary compression position, Sp1 (S200).

The microcomputer control means 5 uses the preliminary compression position Sp1 detected during the first molding operation, the set measurement reference position S, and calculated measurement detection position, So1, to calculate the second measurement detection position, So2, from the following equation.

$$So2=S-(Sp1-So1) \qquad Eq.\ (1)$$

Then, the stored value of the measurement detection position So is updated to So2 to complete the correction of the first measurement position. Here, the position movement ΔSp1 caused by the preliminary compression process can be calculated from the following equation.

$$\Delta Sp1=Sp1-So1 \qquad Eq.\ (2)$$

It is the position movement by which the position of the plunger moves from the measurement detection position, So1, and further reaches the preliminary compression position, Sp1, during the blocking process and the preliminary compression process.

According to Eq. (1), the second measurement detection position, So2, is the position to which the plunger moves forward by the position movement ΔSp1 caused by the preliminary compression process from the measurement reference position, S. Then, the second measurement continues until the above-mentioned second measurement detection position, So2, is reached, and blocking and preliminary compression take place in succession. Here, the position movement ΔSp2 caused by the preliminary compression process is almost the same as that of the first operation, since the operation follows the previous operation. Therefore, the position of the plunger after it is blocked in the second molding shot and preliminarily compressed is at or in near agreement with the measurement reference position, S. Likewise, the third and subsequent measurement detection position So3, So4, and so on are processed in the same manner.

As described above, the microcomputer control means 5 uses the stored (n−1)th preliminary compression position, Spn−1, the measurement detection position, Son−1, and the measurement reference position, S, in the (n−1) th molding shot, to calculate the measurement detection position, Son, in the nth molding cycle from the following equation.

$$Son = S-(Spn-1-Son-1) \qquad Eq.\ (3)$$

The nth molding shot is performed taking Son as the measurement detection position. Here, the position movement ΔSpn−1 caused by the preliminary compression process results in the following:

$$\Delta Spn-1=Spn-1-Son-1 \qquad Eq\ (4)$$

The measurement detection position, So, is, as seen from the above, corrected so as to cancel the position movement ΔSp caused by the preliminary compression process. The position movement ΔSp caused by the preliminary compression process varies more when the molten resin contains a lot of dissolved gas, which has a lower density, and varies less when the density is higher i.e. when there is less dissolved gas. When the position movement is compared for each shot, they are essentially the same over a short period of time; but may vary gradually over a long period of time. Therefore, when the measurement is completed at the corrected measurement detection position, So, and preliminary compression is performed after blocking, the volume of the molten resin eliminates the effect of the volume of the dissolved gas, and essentially agrees with the desired set volume measurement which is represented by the measurement reference position, S. This is because in normal molding operation the density of the molten resin seldom varies abruptly. Even where the plasticization state gradually varies over a longer period of operation, if the measurement detection position, So, is corrected as above, it is possible to bring the volume of the measured molten resin material into essentially exact agreement with the measurement reference position S.

Next, fill control (S200) during the injection process will be described. The fill control gives priority to speed control on the basis of the position of the plunger which is the same as that used in conventional technology. In this invention, however, the volume of the molten resin under preliminary compression is essentially the same as the volume set by the measurement reference position, S, since the above-described measurement detection position, So, is corrected as above, and the density of the molten resin is generally uniform. Furthermore, in the fill control of the present invention, the accurate filling inherent when using injection by means of a plunger, is started on the basis of the preliminary compression position, Sp, and the plunger is incrementally moved forward from this position by a predetermined stroke. Thus, the cushion amount after filling as well as the filling amount hardly varies between each molding shot. In addition, the pressure at the V-P switch point at the time when the fill operation is complete hardly varies. Thus, the first embodiment is an adequate injection method for thin-wall precision parts.

Figure 5:
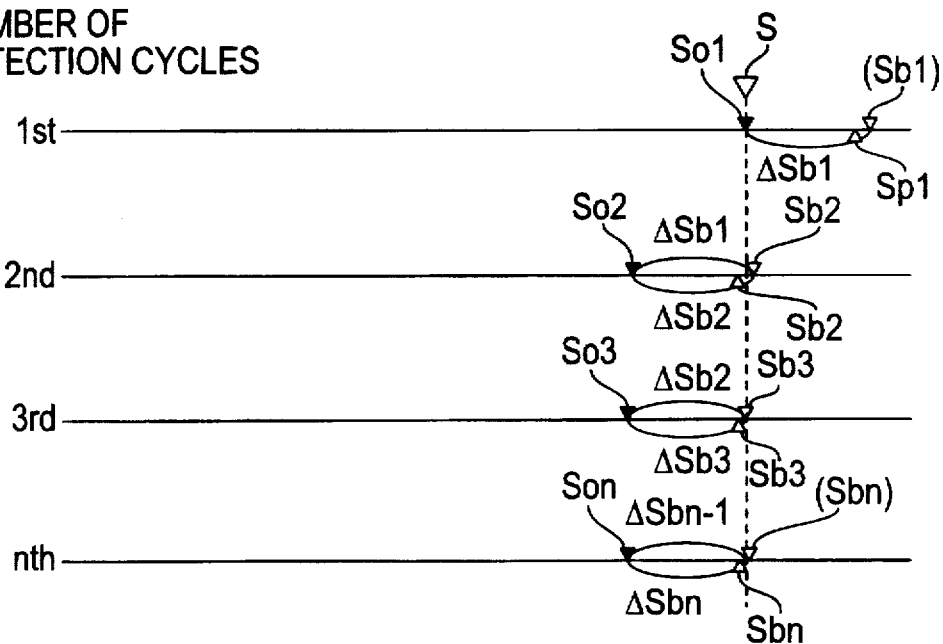
FIG. 5 is a depiction which indicates a method in which the measurement detection position shifts every measurement by correction of the measurement detection position in accordance with a second embodiment of the invention.
Figure 4:
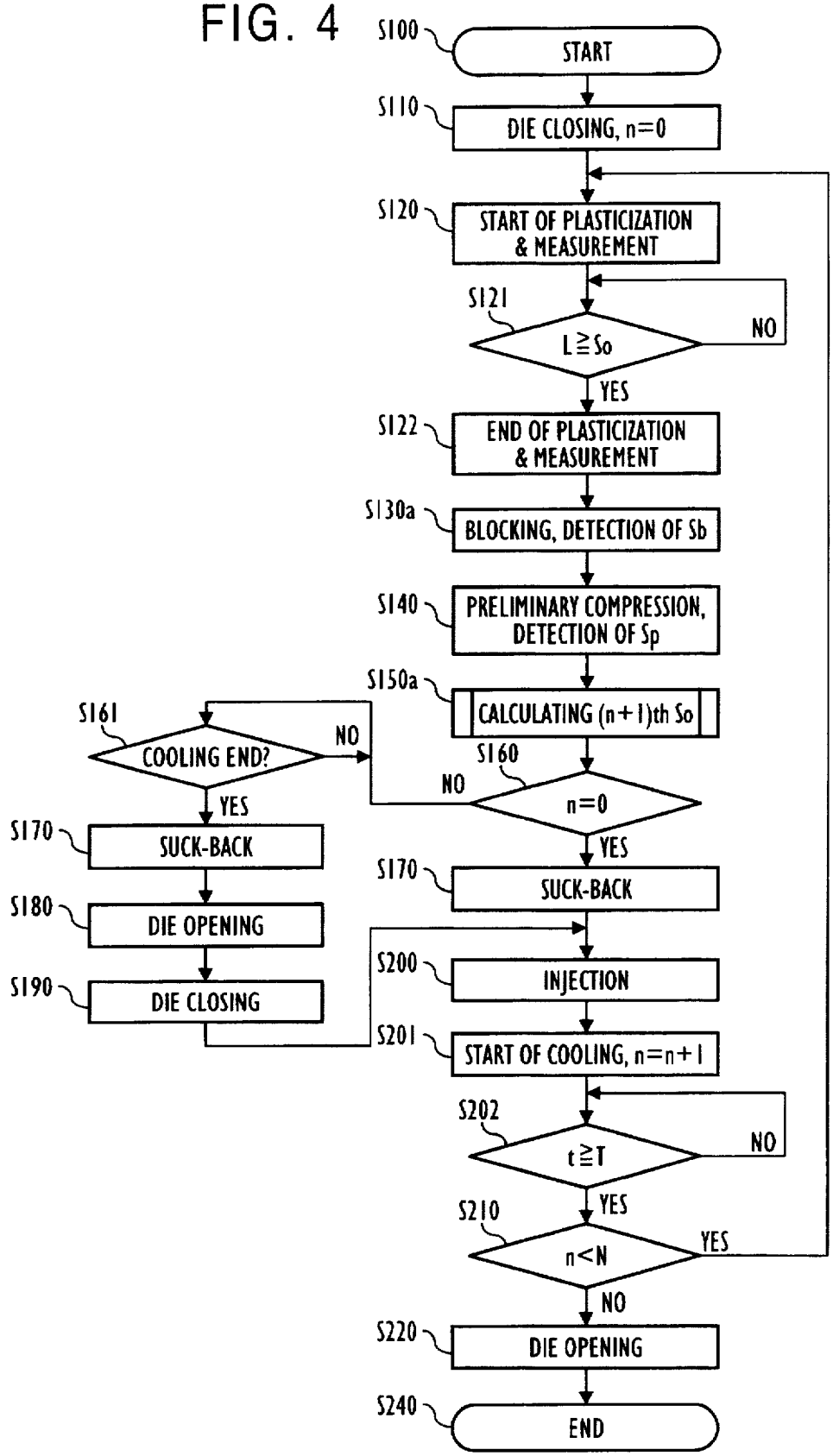
FIG. 4 is a flow chart indicating the control procedure of a second embodiment of the invention.

Next, the measurement position correction (S150a) and filling control (S200) of the second embodiment of the invention will be described based on FIG. 4. Compared to the flow chart of the first embodiment (FIG. 2), the steps S130a and S150a differ, and the description is focused on these steps. The typical manner in which the measurement detection position, So, is corrected for each molding shot is indicated in FIG. 5.

First, a first measurement is performed until the plunger reaches the measurement detection position So1=S (S121 and S122). The measurement reference position S is the same as that of the first embodiment. Next, blocking starts, and the position to which the plunger moves backward is detected as the block position Sb1 (S130a). The block position Sb1 is the position to which the plunger moves backward from the measurement detection position So1 by $\Delta$Sb1. Then, preliminary compression takes place (S140) to compress the molten resin. This causes the plunger to move slightly forward, and this position is detected as the preliminary compression position, Sp1. Subsequently, the filling operation is performed on the basis of the preliminary compression position, Sp1 (S200).

The microcomputer control means 5 uses the blocking position Sb1 detected during the first molding shot, the set measurement reference position, S, and calculated measurement detection position, So1, to calculate the second measurement detection position. So2, in accordance with the following equation.

$$So2 = S - (Sb1 - So1) \qquad \text{Eq. (5)}$$

Then, the stored value of the measurement detection position, So, is updated to So2 to complete the correction of the first measurement position. Here, the position movement $\Delta$Sb1 caused by the blocking process can be calculated from the following equation.

$$\Delta Sb1 = Sb1 - So1 \qquad \text{Eq. (6)}$$

The position movement, $\Delta$Sb1 is the position movement by which the position of the plunger moves from the measurement detection position, So1, during the blocking process.

According to Eq. (5), the second measurement detection position, So2, is smaller than the measurement reference position, S, by position movement caused by $\Delta$Sb. Then, the second measurement continues until the above-mentioned second measurement detection position, So2, is reached, and blocking takes place. Here, the position movement, $\Delta$Sb, caused by blocking is almost the same as that of the first operation. Therefore, the position of the plunger after it is blocked during the second molding shot is at or near agreement with the measurement reference position S. Likewise, the third and subsequent measurement detection positions So3, So4, and so on are recalculated and newly stored.

As described above, the microcomputer control means 5 uses the stored (n−1)th blocking position, Sbn−1, the measurement detection position, Son−1, and the measurement reference position, S, in the (n−1)th molding shot, to calculate the measurement detection position, Son, in the nth molding cycle from the following equation.

$$Son = S - (Sbn-1 - Son-1) \qquad \text{Eq. (7)}$$

The nth molding shot is performed taking Son as the measurement detection position. Here, the position movement, $\Delta$Sbn−1, caused by the blocking process may be represented by in the following:

$$\Delta Sbn-1 = Sbn-1 - Son-1 \qquad \text{Eq. (8)}$$

When the physical properties of the molten resin vary, the blocking position, Sb, varies with variation in physical properties, and thus the position movement, $\Delta$Sb, caused by blocking varies accordingly. In the case, since the measurement detection position, So, is corrected by the position movement, $\Delta$Sb, caused by the previous blocking operation the volume of the molten resin which has been blocked after the measurement is completed at this measurement detection position, So, substantially agrees with the volume represented by the measurement detection position, So. Since the density of the molten resin is made uniform with respect to the original density of the molten resin by the preliminary compression, the volume of the molten resin can accurately be measured. Since molten resin, whose density has been made uniform, is used for filling on the basis of the preliminary compression position, Sp, the volume of filled molten resin is constant, with little or no variation in cushion amount. As a result, the pressure at the V-P switch point when the filling operation is completed hardly varies. Thus, the second embodiment is an adequate injection method for thin-wall precision parts. In the case of this embodiment, the preliminary compression position, Sp, causes a slight deviation from the measurement reference position, S. However, unless the plasticization state is unstable, this deviation is nearly constant, and the second embodiment provides the same effect as that of the first embodiment.

The blocking mentioned in both first embodiment and second embodiment is described as a blocking method in which the screw is moved forward to block the connection passage. However, it should be noted that the measurement detection position may also be corrected in the same manner even when the screw moves backward to close the connection passage or where the connection passage is closed by a rotary type ball valve or the like. With the former method, the molten resin in the injection chamber is pulled back toward the plasticization chamber, and thus the blocking position, Sb, is in an advanced position with respect to the measurement detection position, So. As a result, the above-described position movement, $\Delta$Sb, caused by blocking exhibits a minus value. Therefore, the next corrected measurement detection position, So, increases by the absolute value of the position movement, $\Delta$Sb, caused by blocking from the measurement reference position, S. Next, when the molten resin is measured on the basis of this measurement detection position, So, the blocking position, Sb, essentially agrees with the measurement reference position, S. With the latter method, since the position of the plunger is not varied by blocking, the position movement, $\Delta$Sb, becomes 0.

We claim:

1. A method of using a preplasticization injection molding machine having a plasticization chamber for plasticizing a synthetic resin material, an injection chamber for injecting the synthetic resin material into a mold die cavity, a plunger mounted in said injection chamber for reciprocal movement therein, and a connection passage connecting said plasticization chamber and injection chamber, said method comprising:

measuring the synthetic resin material plasticized in said plasticization chamber as it is fed to said injection chamber through said connection passage, said measuring step terminating at a measurement detection position;

blocking said connection passage;

preliminarily compressing the synthetic resin material in said injection chamber to a predetermined pressure;

detecting a preliminary compression position of said plunger after the step of preliminary compressing;

controlling the filling of the mold die cavity with the synthetic resin material based on said preliminary compression position; and correcting the measurement detection position for the measuring step of the next injection based on any movement from said measurement detection position to said preliminary compression position.

2. The method according to claim 1 further comprising sucking back at least some synthetic resin material in said injection chamber after the step of preliminarily compressing but prior the step of controlling the filling the mold die cavities.

3. A method of using a preplasticization injection molding machine having a plasticization chamber for plasticizing a synthetic resin material, an injection chamber for injecting the synthetic resin material into a mold die cavity, a plunger mounted in said injection chamber for reciprocal movement therein, and a connection passage connecting said plasticization chamber and injection chamber, said method comprising:

measuring the synthetic resin material plasticized in said plasticization chamber as it is fed to said injection chamber through said connection passage, said measuring step terminating at a measurement detection position;

blocking said connection passage;

detecting a blocking position of said plunger after said step of blocking;

preliminarily compressing the synthetic resin material in said injection chamber to a predetermined pressure;

detecting a preliminary compression position of said plunger after preliminarily compressing the synthetic resin material;

controlling the filling of the mold die cavities with said synthetic resin material based on said preliminary compression position;

correcting the measurement detection position for the next measuring step based on a movement of said plunger from said measurement detection position to said blocking position.

4. The method according to claim 3 wherein the step of controlling the filling of the injection chamber further comprises sucking back at least some synthetic resin material after the step of preliminarily compressing but prior to the step of controlling the filling of the mold die cavities.

* * * * *